April 9, 1968 S. M. DE CORSO ET AL 3,377,418
SMALL DIAMETER FLUID COOLED ARC-ROTATING ELECTRODE
Filed Aug. 28, 1967
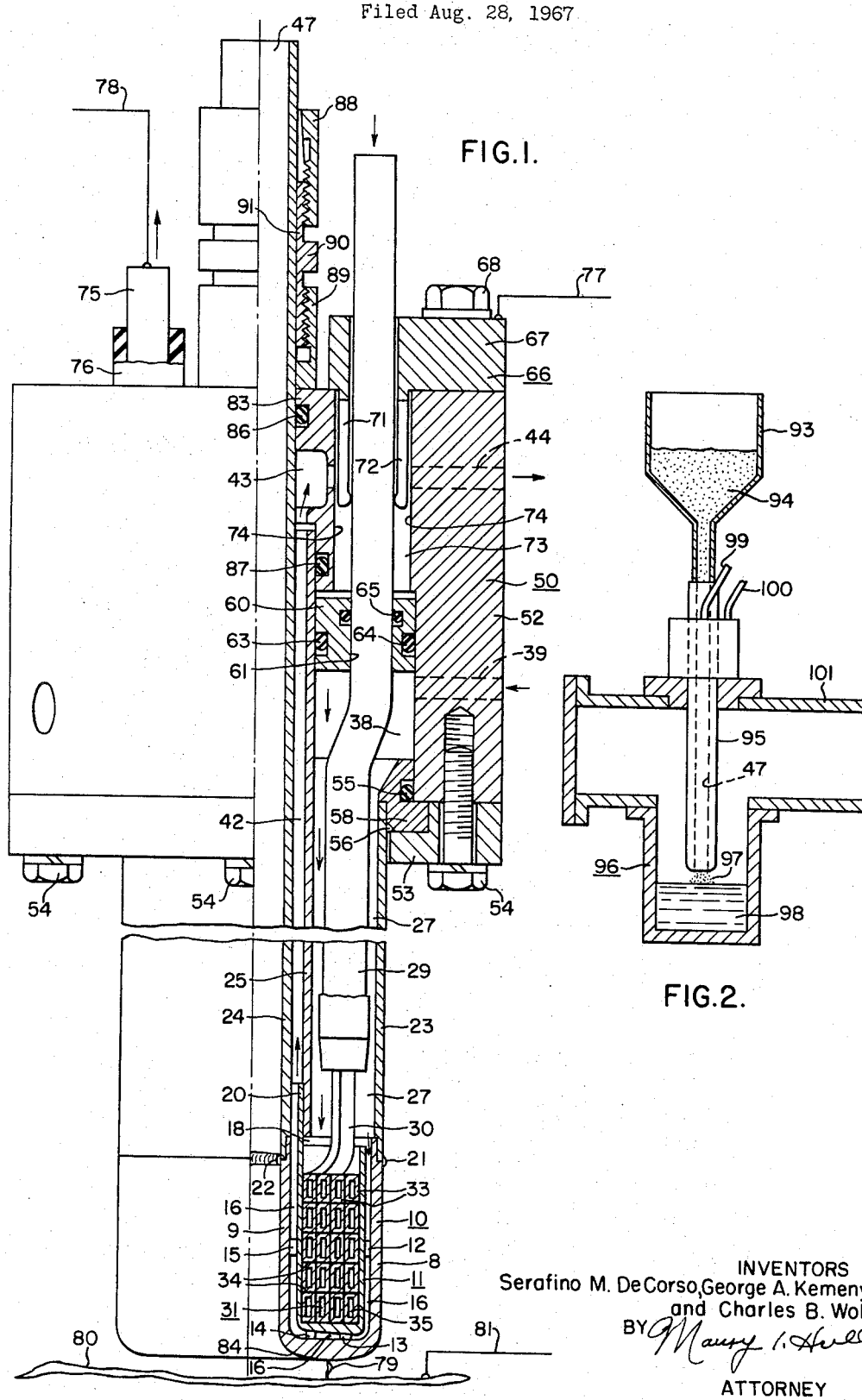
INVENTORS
Serafino M. DeCorso, George A. Kemeny
and Charles B. Wolf
BY
ATTORNEY

United States Patent Office 3,377,418
Patented Apr. 9, 1968

3,377,418
SMALL DIAMETER FLUID COOLED
ARC-ROTATING ELECTRODE
Serafino M. De Corso, Media, George A. Kemeny, Export, and Charles B. Wolf, Irwin, Pa., assignors to Westinghouse Electric Corporation, Pittsburgh, Pa., a corporation of Pennsylvania
Filed Aug. 28, 1967, Ser. No. 663,714
13 Claims. (Cl. 13—9)

ABSTRACT OF THE DISCLOSURE

A small diameter electrode for an arc or a vacuum furnace has an annular electrode tip composed of a material having high thermal conductivity brazed or otherwise joined to a supporting tube. Within the annular tip, which is U-shaped in cross-section, is a field coil within a coil cup spaced from all of the inner walls of the tip including the bottom by studs. The studs may be secured to, or formed integrally with, the tip, the coil cup, or both. Cooling fluid brought to the tip exerts a pressure on the coil cup maintaining the studs in close abutting relationship to the other suraface, and cooling fluid flows around an annular passageway U-shaped in cross-section extending around the entire periphery of the tip near the arcing surface, to cool the tip. The field coil itself is composed of insulated turns of hollow conduit, and the leads thereto may be insulated so that the field coil is separately excited, or one lead to the field coil may be insulated and one lead thereto electrically connected to the supporting structure of the electrode tip whereby the field coil is energized in series with the arc-producing current. Contact fingers in slidable engagement with a conduit are used to prevent stresses due to differential thermal expansion.

BACKGROUND OF THE INVENTION

Field of the invention

The invention relates to fluid cooled electrodes suitable for use in furnaces, especially vacuum furnaces, and having a field coil near the arc producing surface which substantially continuously moves the arc to reduce the arc dwell time at any one location and reduce erosion of the electrode and evaporation of material therefrom.

DISCUSSION OF THE PRIOR ART

Description of the prior art

Heretofore, it has been difficult to produce a small diameter electrode because of the necessity of providing means for mounting and securing a field coil housing inside an annular tip in spaced relation thereto to provide fluid flow passageways for cooling the tip. Our invention overcomes this difficulty by utilizing the pressure of fluid which is to cool the tip to force a field coil cup into proper position and to maintain it therein, the cup being spaced by the aforementioned studs from the inside walls and bottom of the tip. We eliminate the need for a field coil housing composed of electrically insulating material; the turns of our coil are insulated which insulates them from each other and from the coil cup. Prior art electrodes have been troubled by electrical contact problems due to thermal expansion of the parts of the electrode after heating, and our invention solves these problems by the use of spring contact fingers mounted on the housing or supporting structure of the electrode in slidable electrical contact with one conductor or lead to the field coil, permitting the field coil to be energized in series with the arc-producing current.

Summary of the Invention

Novel structure is provided for a small diameter electrode utilizing the pressure of cooling fluid to maintain a field coil cup within the tip in spaced position from the inside walls and bottom of the tip to provide a passageway for the flow of cooling fluid near the arcing surface. Novel electrical contact means, not impaired by thermal expansion, is provided for bringing arc-producing current to the electrode tip. Further, novel supporting structure and improved characteristics of the fluid flow passageways are provided.

BRIEF DESCRIPTION OF THE DRAWINGS

FIGURE 1 is a view partially in section of an electrode according to the preferred embodiment of our invention; and FIG. 2 shows the electrode as employed in a laboratory vacuum furnace.

DESCRIPTION OF THE PREFERRED EMBODIMENTS

Referring to FIGURE 1, the electrode is seen to include an electrode tip generally designated 10, shown partially in cross-section, the tip being annular in shape and U-shaped in cross-section as seen, having disposed therein an annular field coil cup generally designated 11 spaced from the inner walls and bottom of the tip by studs, four of these being shown at 12, 13, 14 and 15, to provide a fluid flow passageway 16 between the inner wall of the tip and the adjacent wall of the coil cup. The studs may extend from the inside walls and bottom of tip 10, may extend from the walls of bottom of cup 11, or both. The tip 10 is secured as by brazing at 21 and 22 to two annular coaxially disposed tubes 23 and 24 which form part of the supporting structure, tube 23 being of larger diameter. An additional tube 25 coaxially disposed with respect to both tubes 23 and 24 is seen, tubes 23 and 25 defining a passageway 27 therebetween in which is disposed a conduit 29 composed of electrically conductive material, conduit 29 being hollow and bringing a high dielectric fluid such as pure water through input or output lead or conduit extension 30 of the field coil generally designated 31. As stated hereinbefore, the field coil 31 may be connected in series with the arc producing current for tip 10 or the field coil may be separately excited, in which latter case lead 30 may be either an input or output lead as convenient.

Field coil 31 is seen to include a number of closely spaced turns of a hollow conduit, the turns being designated 33 and insulated from each other by insulation 34, and also insulated from coil cup 11 by insulation 34. Passageways 35 within the turns permit a cooling fluid to flow through the coil.

The aforementioned conduit 29 is spaced from the inner walls of the aforementioned tubes 25 and 23 so that fluid flows around and outside of the conduit in the aforementioned passageway 27 from a fluid inlet header 38 having a fluid inlet 39 shown in dashed line as not being in the plane selected for illustration, fluid from the inlet 39 flowing into header 38, thence down the passageway 27, thence exerting a pressure against the upper end or upper surface 18 of the coil cup 11 and forcing the aforementioned cup into firm position where the cross-sectional area of fluid flow passageway 16 is defined substantially solely by the dimensions of the studs. From the top of the field coil cup fluid passes into the aforementioned passageway 16 adacent the tip wall of larger diameter 8, following a path indicated by the arrows. Thence the fluid flows down and adacent the inside wall of the tip, around the inside bottom wall of the tip, up the inside wall of smaller diameter 9 of the tip, and into a passageway 42 formed between the aforementioned tubes 24 and 25. Passageway 42 communicates at the upper end thereof with header 43 which has a fluid outlet 44 shown in dashed line as not being in the plane selected for illustration.

The upper end of conduit 29 is connected preferably by a hydraulic insulator, not shown for convenience of illustration, to a source of cooling fluid or a fluid discharge path for the field coil, for example, chemically pure water. Either conduit 75 or conduit 29 may serve as a fluid input.

The aforementioned tube 24 is seen to provide a central passageway extending axially of the electrode and passing through the whole electrode, the passageway being designated 47. Passageway 47 may be used for introducing various substances into the furnace if desired, and it will be understood that the upper opening thereof may be closed at will.

The main support for the interior portions of the electrode is provided by a housing generally designated 50. The housing 50 may include a substantial cylindrical portion 52 having a relatively thick wall secured at the lower end thereof to an annular plate 53 by a plurality of peripherally spaced bolts 54, the plate 53 serving as a clamping ring to hold annular ring 58 in place with good mechanical and electrical contact. Annular ring 58 is attached to tube 23 by brazing at 56 or other means and has an annular groove containing an O-ring 55 to form a fluid tight seal as shown. Disposed within the housing 50 between the inner wall of cylindrical portion 52 and the aforementioned tube 25 is a ring 60 composed of insulating material and having a bore or passageway 61 therethrough for the passage of the aforementioned conduits 29 and 75. It is seen that the ring 60, which it will be understood is annular in shape and extends around the entire electrode, forms in effect the upper end or wall of the annular fluid header 38. For this reason, a plurality of O-rings 63 and 64 are shown in annular grooves, the O-rings providing a fluid tight seal with the tube 25 and a fluid tight seal with the inner wall of cylindrical portion 52, and a third O-ring 65 is seated in an annular groove in member 60 and provides a fluid tight seal for the field coil lead or conduit 29, and a fourth O-ring (not shown) for conduit 75.

Mounted on the upper end of the housing 50 is a contact finger member generally designated 66 having a supporting portion 67 secured to the upper end of the housing 50 by a pair of bolts, one of these being shown at 68, the contact finger member 66 having a plurality of contact fingers secured thereto, two of the spring contact fingers being shown at 71 and 72 extending into a space or bore 73 having a wall 74. Housing 50 has an inner portion 83 providing aforementioned fluid header 43. The contact fingers it is understood exert spring pressure on conduit 29, the contact fingers extending around the entire periphery of conduit 29, only two of the contact fingers being shown for convenience of illustration.

Extending from the upper end of the housing 50 is an additional conduit 75 composed of conductive material which it is understood is connected by lead means, not shown, which may correspond to means 30, to the aforementioned field coil 31, and it will be understood that conduit 75 is connected by a hydraulic insulator, not shown for convenience of illustration, and thence to a fluid outlet or inlet, cooling fluid for the field coil entering the conduit 29 and exiting through the conduit 75, or vice versa. Conduit 75 is seen to be enclosed in a sleeve 76 composed of electrically insulating material which it is understood may pass through the entire housing 50 including an additional bore, not shown, corresponding to bore 61 in member 60, and insulate the conduit 75 along the entire length thereof and the lead, not shown, connecting conduit 75 to the field coil 31.

According to the foregoing description the field coil 31 is connected in series with the arc producing current. A lead 78 is connected to conduit 75, and the lead 78 is connected to one terminal of a source of potential. An arc 79 is seen taking place from the tip 10 to a melt 80 symbolically connected by lead 81 to the other terminal of the source of potential to which lead 78 is connected. It will be understood that the melt 80 may be any surface of opposite polarity, for example, another electrode.

The current path through the field coil and through the electrode which produces arc 79 is traced as follows: From lead 78 through conduit 75 through field coil 31, through lead 30, conduit 29, contact fingers including 71 and 72, contact member 66, housing 50, including the portion 83, composed of conductive material and making electrical contact with the aforementioned tubes 23, 24 and 25, thence down the three aforementioned tubes 23, 24 and 25 to the arcing surface 84 of the tip 10. The main current path is through tube 23.

All of the aforementioned elements or portions which provide the current path are composed of electrically conductive material.

Additional O-rings 86 and 87 are provided to give a fluid tight seal between portion 83 and tubes 24 and 25, respectively. There is seen on the portion of tube 24 extending above the top portion of the housing 50 nuts 88 and 89 and the chuck 90 having sleeve portion 91, sleeve 91 snugly fitting the outside surface of the aforementioned tube 24, nuts 88 and 89 being threaded to chuck 90. The purpose of this chucking device is to be able to grip tube 24 and adjust the nut 89 to the top surface of housing 50, thereby providing mechanical support to tip member 10 when the force of the water pressure is applied to its inner surface.

As previously stated, the field coil 31 may be connected to a source of potential separate from the source which supplies the arc. In the latter case, the contact fingers including fingers 71 and 72 would be dispensed with, and the conduit 29 would pass through an insulating sleeve or covering beyond the external or upper portion of the housing 50 in a manner similar to that shown for conduit 75. Conduits 75 and 29 would then be connected to a source of potential, and one would as well be connected to a source of cooling fluid with the other exhausting fluid. The body of the electrode would be connected to the source of potential which supplied the arc current, for example, by suitable connecting lugs secured under bolt 54 or at another convenient position, lead means being symbolized at 77, it being understood that when the arc current flows through the coil, lead 77 is not connected in circuit.

By way of further summary of some of the important features of our invention the electrode tip is brazed to the supporting tubes, and when expended may be removed by heating. This brazing scheme permits small electrode diameter not otherwise readily obtainable. It is to be noted that the water passage 16 is made of increasing width or cross-section toward the inner wall of smaller diameter of the electrode to permit proper water flow at the inner smaller diameter wall section, that is, so that water flow is not excessively throttled by lack of flow cross-section near the inner diameter. It is further noted that the bore or passageway 47 is open to permit introduction of furnace materials or other additives. Connections for this purpose may be made external to the electrode at the end of the tube forming the passageway. As aforementioned, the coil configuration is designed to provide water pressure behind or against the coil cup, forcing the coil and the surrounding coil cup or housing 11 toward the tip. Without this feature it would be difficult to maintain the proper water gap 16 because of the long electrode length. To obtain the desired water pressure, coolant water enters into the outer diameter passageway 27 and leaves through the inner annular gap 42. The single wall construction of the coil cup extension 20 allows more space for water flow and coil leads than would be otherwise available. The coil is insulated with water resistant insulation since it must run in a water immersed condition. The coil leads are brought out externally so that the coil may be run in series with the arc or be separately excited. When run in series the field coil can provide ballast in the arc circuit. Series connection of the field coil is considered practical especially for direct current operation. The field coil is internally water cooled, and the field coil leads consist of tubes or conduits brazed to the tubular field coil winding. Shown at the upper end of conduit 29 are the aforementioned spring contacts making an electrical connection between this field coil lead or conduit and the housing 50. The other field coil lead is insulated from the housing 50 by the insulating tube 76. As aforementioned, if the field coil is to be separately excited insulating tubes or sleeves are provided on both field coil leads or conduits preventing shorting of the leads to the housing 50.

While an internally cooled field coil is shown, an externally cooled field coil may be used with the leads immersed in the liquid. Further, a higher dielectric liquid rather than water can be used as the cooling fluid to provide better insulation. The mounting structure permits ready disassembly of the electrode including the connections of the field coil, in series with the arc or for separate excitation. In addition, the mounting size permits bolting of the mounting to a laboratory vacuum furnace.

Particular reference is made to FIG. 2 showing a vacuum furnace generally designated 96 employing the electrode shown at 95 similar to that of FIG. 1 with a hopper 93 attached to supply feed material 94 into the furnace through the aforementioned central passageway 47. The arc is shown at 97 and the melt at 98. Connections 99 and 100 symbolize fluid and electrical connections to the electrode. The portion 101 of the furnace it is understood is connected to a vacuum pump, not shown for convenience of illustration.

It is to be noted that the electrode field coil may provide a moderate stirring of the melt, which is desirable in many refractory metal furnaces.

Operation may be either on alternating current or direct current as desired. On alternating current operation, that is, alternating currents supplying the arc current, the field coil may be separately excited by direct current.

The invention includes the use of three electrodes connected to the three phases of a three-phase source.

The electrode because of its size is suitable for energization from standard welding units.

The foregoing written description and the drawings are illustrative and exemplary only and are not to be interpreted in a limiting sense.

We claim as our invention:

1. An electrode comprising in combination an annular electrode tip, U-shaped in cross-section and composed of electrically conductive material, an annular magnetic field coil disposed within the tip, a coil cup enclosing the field coil, the field coil including a plurality of turns of hollow conduit electrically insulated from each other and from the coil cup, a plurality of studs within the tip spacing the coil cup from the inside wall surfaces and inside bottom surface of the tip to provide a fluid flow passageway, a supporting structure for the electrode tip composed at least in part of conductive material and completing a path for arc current, the supporting structure including means forming a fluid inlet passageway for bringing cooling fluid to the passageway in the tip, the pressure of the fluid in the inlet passageway normally forcing the coil cup of the field coil into a position whereat the cross-section of the fluid flow passageway in the tip corresponds substantially to the lengths of said studs, a fluid inlet and a fluid outlet for the field coil both composed of conductive material, means insulating at least one of the fluid inlet and fluid outlet for the field coil from the remainder of the electrode structure, a tube extending axially of the electrode and forming part of the supporting structure for the tip, said tube providing an axial passageway through the electrode, the supporting structure including means forming an additional passageway communicating with the passageway in the tip for the flow of fluid from the tip and exhausting said last named fluid from the electrode.

2. An electrode according to claim 1 in which some of the studs are disposed between the bottom of the field coil cup and the bottom inner surface of the electrode tip and wherein the wall of the field cup has a non-uniform thickness at the bottom to provide a fluid flow passageway around the bottom of the cup which is greater in cross-section on the side of the cup where fluid exits than it is on the side of the cup where fluid enters the passageway.

3. An electrode according to claim 1 in which at least some of the studs extend from the inside walls and bottom of the electrode tip.

4. An electrode according to claim 1 in which at least some of the studs extend from the walls and bottom of the coil cup.

5. An electrode according to claim 1 in which one of the inlet and outlet to the field coil is uninsulated, and in which the supporting structure additionally includes a plurality of spring contact fingers composed of electrically conductive material making electrical contact with that one of the inlet and outlet to the field coil which is uninsulated and making electrical contact with the electrically conductive portion of the supporting structure, the electrode being further characterized as providing an arc current path from that one of the inlet and outlet to the field coil which is insulated through the field coil thence through said uninsulated one and through the supporting structure of the electrode including said contact fingers and thence to the electrode tip, said insulated one being adapted to be connected to one terminal of a source of potential to produce an arc from the electrode tip to a surface of opposite polarity connected to the other terminal of the source of potential.

6. An electrode according to claim 5 in which the uninsulated fluid conduit connected to the field coil is additionally characterized as being slidable within the contact fingers whereby thermal expansion within the electrode tip and within the electrode is prevented from developing stresses on the last-named input conduit to the field coil and on the supporting structure.

7. An electrode according to claim 1 in which the supporting structure includes in addition to said tube second and third tubes, all of the tubes being mounted coaxially with each other, the first named, second and third tubes being of graduated increasing diameters, the first named and second tubes being spaced from each other to form a fluid flow passageway therebetween, the second and third tubes being spaced from each other to form said inlet passageway for bringing cooling fluid to the passageway in the tip, at least one conduit lead to the field coil passing through said inlet passageway while being electrically insulated therefrom, said last named passageway receiving fluid and conducting fluid under pressure to the coil cup, said pressure being exerted against the top of the field coil cup, said fluid thereafter entering the passageway around the tip and after flowing through the passageway around the tip flowing through said passageway between the first named and the second tube.

8. An electrode according to claim 7 including in addition an annular ring composed of electrically insulating material disposed in the supporting structure and separating the fluid therein from the contact fingers and making a sealing engagement with the conduit and the adjacent wall portion of the supporting structure.

9. Vacuum furnace apparatus comprising, in combination, a vacuum furnace, the furnace including a chamber for melt, an electrode extending into said furnace, said electrode having an axial passageway therethrough, said electrode having an annular tip U-shaped in cross section, a field coil cup and field coil of annular shape disposed within the tip, a plurality of studs spacing the field coil cup from the inside walls and bottom of the tip, means for bringing current to the electrode tip to produce an arc to said melt in the furnace, means for bringing fluid to cool the coil and means for conducting said fluid therefrom, the electrode including means forming an inlet passageway for bringing cooling fluid to the electrode tip, said last named fluid exerting a pressure against the upper surface of the coil cup and maintaining the cup in closely fitting engagement within the annular space of the electrode tip, that fluid which exerts force against the coil cup thereafter passing into the fluid flow passageway between the coil cup and the inside surface of the electrode tip, means forming a fluid flow outlet passageway for conducting fluid from the electrode after it has cooled the tip, and hopper means mounted on top of the electrode in communication with the axial passageway and adapted to receive material to be fed to the melt in the furnace.

10. Furnace apparatus according to claim 9 in which the electrode is additionally characterized as including means for connecting the field coil in series with the arc current path through the electrode whereby the same current which produces the arc energizes the field coil.

11. Furnace apparatus according to claim 10 including spring contact finger means within the electrode in slidable engagement with one of the means for bringing fluid to cool the coil and means for conducting fluid therefrom forming a part of the electrical circuit and preventing thermal expansion within the electrode from creating strains within the electrode which might produce a leak and thereby destroy the vacuum in the furnace.

12. Furnace apparatus according to claim 9 in which the electrode is additionally characterized as including a plurality of at least three tubes mounted coaxially with each other and having graduated diameters, the tubes being spaced from each other and forming at least two fluid flow passageways between the tubes, said last named fluid flow passageways forming said inlet passageway and said outlet passageway.

13. Apparatus according to claim 12 in which the tube of smallest diameter forms said axial passageway through the electrode.

References Cited

UNITED STATES PATENTS

| 2,472,851 | 6/1949 | Landis et al. | 219—123 XR |
| 2,858,411 | 10/1958 | Gage | 219—75 |
| 501,825 | 7/1893 | Coffin | 13—9 |

FOREIGN PATENTS 102,332  6/1963  Norway.

OTHER REFERENCES

Ser. No. W 16,637, Dec. 6, 1956, Boyer, Germany.

BERNARD A. GILHEANY, *Primary Examiner.*

H. B. GILSON, *Assistant Examiner.*